United States Patent

[11] 3,568,845

[72] Inventor Lino Llamas
Alvarez deBaena 7, Madrid, Spain
[21] Appl. No. 743,689
[22] Filed July 10, 1968
[45] Patented Mar. 9, 1971
[32] Priority July 19, 1967
[33] Spain
[31] 343.183

[54] FILTER CANDLE FORMED BY STACKED ELEMENTS
2 Claims, 22 Drawing Figs.
[52] U.S. Cl. ............................................... 210/488
[51] Int. Cl. .......................................... B01d 25/16
[50] Field of Search .......................................... 210/488, 492

[56] References Cited
UNITED STATES PATENTS

| | | | |
|---|---|---|---|
| 2,260,899 | 10/1941 | Heftler | 210/488X |
| 2,873,030 | 2/1959 | Ashton | 210/492X |
| 2,455,486 | 12/1948 | Hicks | 210/492 |
| 2,547,941 | 4/1951 | Heftler | 210/488 |
| 2,855,106 | 10/1958 | English | 210/492 |

FOREIGN PATENTS

| | | | |
|---|---|---|---|
| 1,069,376 | 2/1954 | France | 210/488 |
| 530,853 | 8/1954 | Belgium | 210/488 |

*Primary Examiner*—Frank A. Spear, Jr.
*Attorney*—Michael S. Striker

ABSTRACT: A stack of elements for a filtering candle in which each of the elements comprises an outer ring portion and a plurality of radially inwardly extending spokes defining between themselves openings axially aligned with each other and spacer means spacing the ring portions in axial direction from each other, in which the spacer means are located radially inwardly of the ring portions.

Inventor
LINO LLAMAS

By *Michael S. Striker*
Attorney

FILTER CANDLE FORMED BY STACKED ELEMENTS

The present invention relates to rings intended to be mounted on the upright bearing element of a filtering device of the type known as a filter candle or cartridge.

Figure 1A:
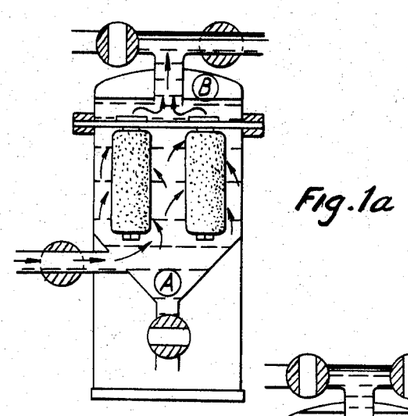
FIGS. 1a—1c illustrate three stages in the operation of a filter equipped with filter candles or cartridges.
Figures 1B, 1C:
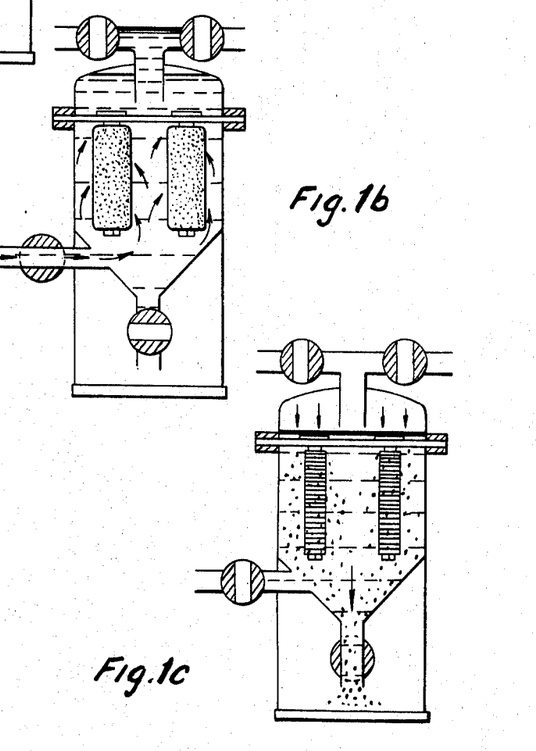

Filter candles or cartridges installed in filters of different kinds may be made of very different types, for example incorporating porous substances, wire coils, metal cloth or various fabrics carried by a metal or plastic frame, and the like. All these arrangements are employed to form a bearer for diatomaceous earth or other filtering substances, such as cellulose, asbestos, etc., for the purpose of accomplishing a filtering action of the kind illustrated in FIGS. 1a—1b of the accompanying drawings, in which the liquid which to is to be filtered passes through the candles or cartridges, the latter being situated in a chamber A comprising an inlet for the polluted liquid, and issues into another compartment B through an outflow passage or duct after having passed through the filter candles or cartridges.

The existing kinds of cartridges employing rings comprise rings possessing a flat side and having small and identical projections wrought on their other side in such manner that, between the rings, they define a number of holes or passages in the radial direction, in such manner that after the rings are assembled one on top of another, they allow a liquid or gas to penetrate to the central duct or passage of these candles or cartridges.

Figure 2:
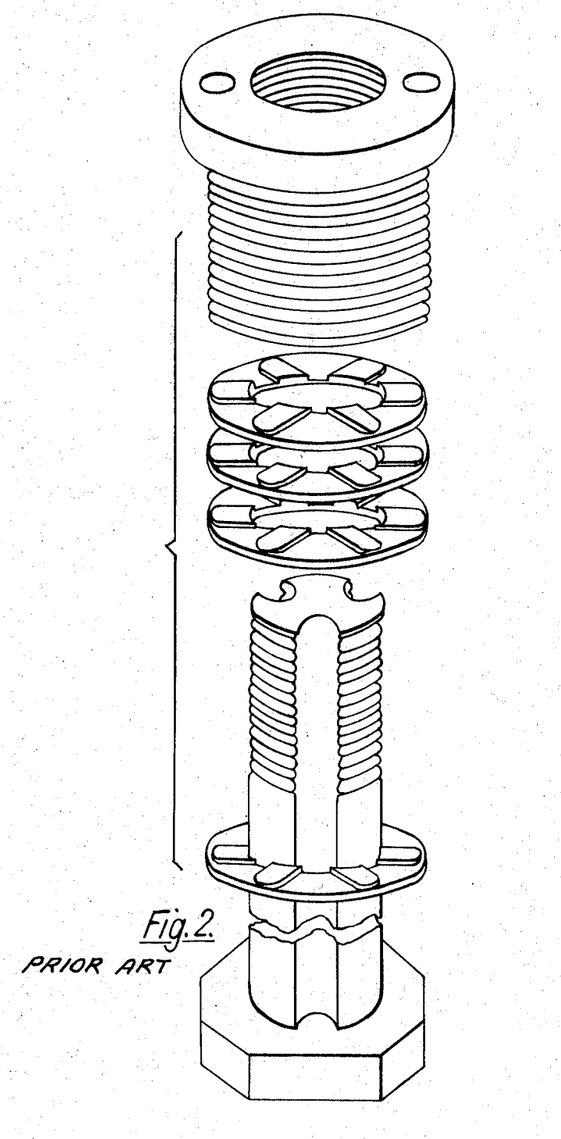
FIG. 2 shows an exploded view in perspective of a conventional filter candle or cartridge.

The said rings are positioned each with its flat side facing towards the projection-bearing side of the adjacent ring on a grooved or fluted spindle, being secured by a head at one end and by a screw-threaded plug at the other end altogether forming a rigid column through which may pass a flow of liquid or gas either from the periphery of the column to the grooves of the bearing rod and from these to the outside through the plug, as apparent from FIG. 2, or in the opposite direction.

This principle employing outflow passages for the filtered liquid wrought in the bearing rod, is that which is applied at present in all the filter candles or cartridges formed by rings.

The present invention provides rings intended to be threaded on a spindle to form a filter candle or cartridge, each ring have a peripheral portion and a number of openings through the ring extending between the inner edge of the peripheral portion and radial portions or spokes which extend from the said peripheral portion towards the center, the said radial portions or spokes moreover incorporating or carrying spacing means, in such manner that the said openings form longitudinal passages with respect to the said filter candle or cartridge which are radially in communication with the surroundings of the said filter candle or cartridge.

In the present invention, the rings lack any projections on their external periphery, and the outflow of the filtrate occurs through openings formed in the rings and not through the bearing rod or spindle, these openings being formed in such positions in the said rings that the outflow of liquid occurs in the portion of the rings closest to their periphery, thus assuring an optimum volume of flow for a particular ring diameter. The central hole in the said rings merely serves the purpose of assembling the rings ensuring alignment between the outflow holes or passages cut out of the rings.

As will be apparent from the preceding, the periphery of the rings being free of projections, a highly uniform and unimpeded flow is possible, free of the actions caused by the venturi effect in the crevices formed in the conventional rings, and the form of the perforations is such as to provide a substantial increase in filtering area, with better opportunities for cleaning by flushing in the opposite direction, and improved fastening of the filter cup, bowl or the like.

Since the outflow of the filtrate occurs through noncentral openings in the said rings, the rod or spindle employed for assembling the rings may be quite plain, so that no outflow grooves need be milled or cut into the same.

Since the said outflow openings are situated close to the periphery of the said rings, a greater cross-sectional area is available for outflow for the same ring diameter, resulting in higher filtering speed and a lower pressure difference between the inlet for the liquid to be filtered and the outlet for the filtrate.

Since the central hole in the said rings has a contour such as to ensure that alignment is established between the perforations wrought noncentrally in the said rings, the outflow passages thus formed will be unobstructed and oppose a lesser resistance to the flow of filtered liquid.

The rings according to the invention, intended for filter candles or cartridges, will be referred to in the following as "peripheral outflow rings," and may be of a variety of shapes, their external contour being apt to be circular, oval, square or of other shape, and the outline of their perforations intended for outflow passages may also be of different shapes, as may be the form of their central locating hole.

The invention will now be described with reference to the accompanying drawings, which illustrate the invention, but do not restrict it.

Identical references have been employed in all the drawings for identical elements, analogous elements or elements fulfilling analogous purposes.

Figure 3:
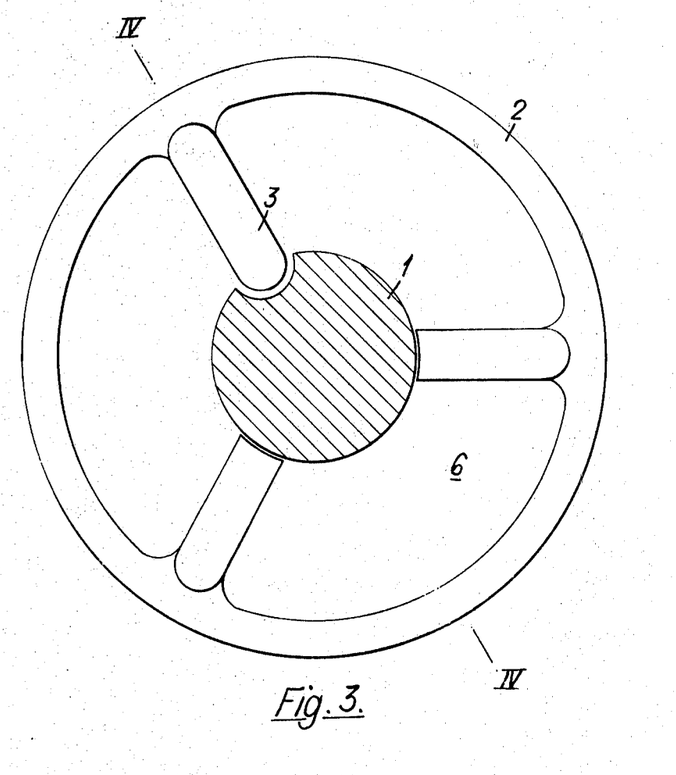
FIG. 3 in a cross section of a filter candle shows a plan view of a possible form of ring.

In addition to the ring, FIG. 3 also shows the central spindle 1 for assembly of the rings.

The rings are marked 2 in each instance; the different "spokes" delimiting the holes or perforations 6 are marked 3.

Figure 18:
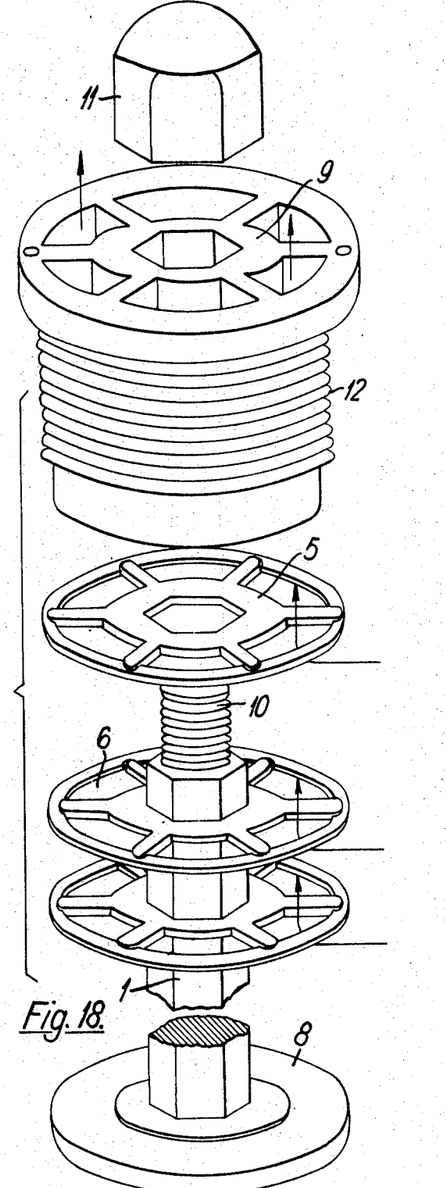
FIG. 18 is an illustration, corresponding to that of FIG. 2, of a filter candle or cartridge according to the invention.
Figure 19:
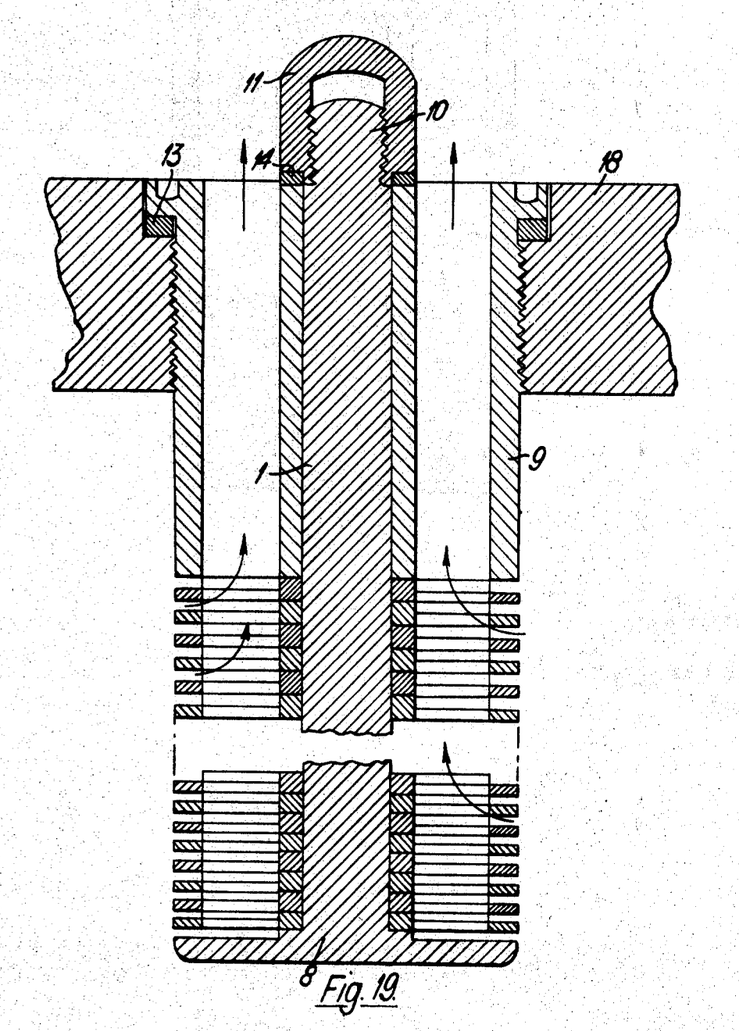
FIG. 19 is an axial section showing the filter candle or cartridge of FIG. 18 in the assembled and installed condition.
Figure 20:
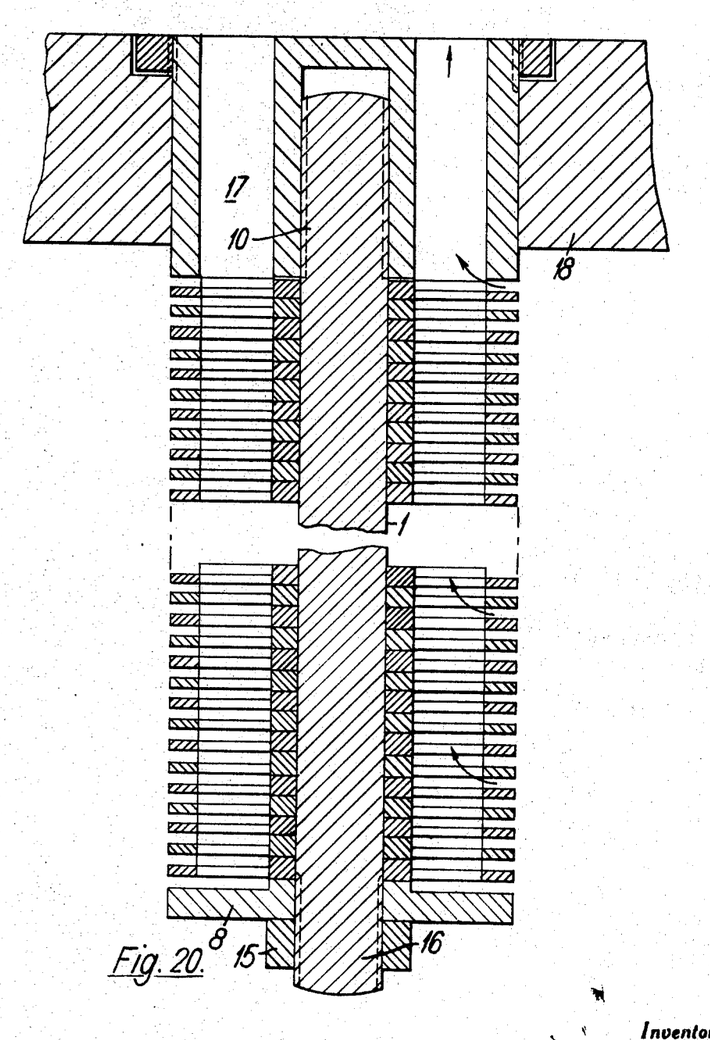
FIG. 20 is an axial section analogous to that of FIG. 19, showing another possible method of installing a filter candle or cartridge according to the invention.

The thicker raised or projecting parts are marked 4, the said parts as a rule extending as far or nearly as far as the outer extremities of the said spokes 3 in FIGS. 3 to 10, the same applying in respect of the ring illustrated in FIG. 18, 19 and 20.

In the rings shown in FIGS. 11 to 17, the raised part is confined to the central portion 5 of the said ring, which is arranged to encircle the stem 1.

Figure 4:
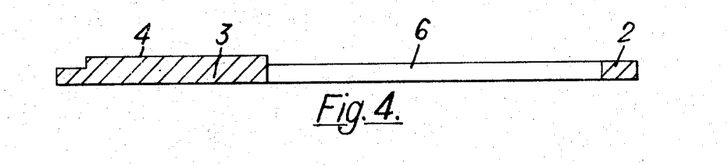
FIG. 4 corresponds to a section along the line IV-IV of FIG. 3.
Figure 5:
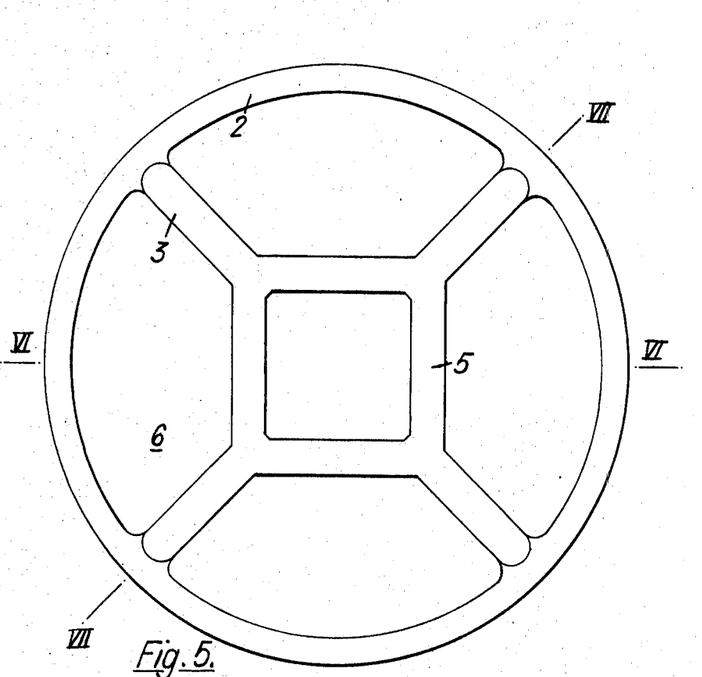
FIG. 5 is a plan view showing another possible form of ring.
Figure 6:
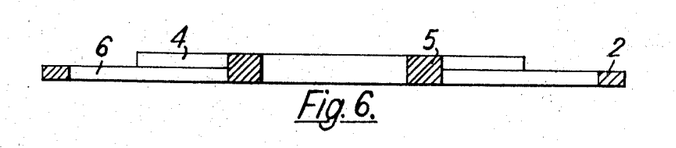
FIG. 6 illustrates a section along the line VI-VI of FIG. 5.
Figure 7:
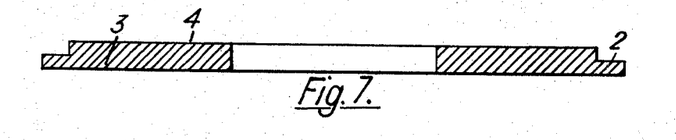
FIG. 7 illustrates a section along the line VII-VII of FIG. 5.
Figures 8, 9:
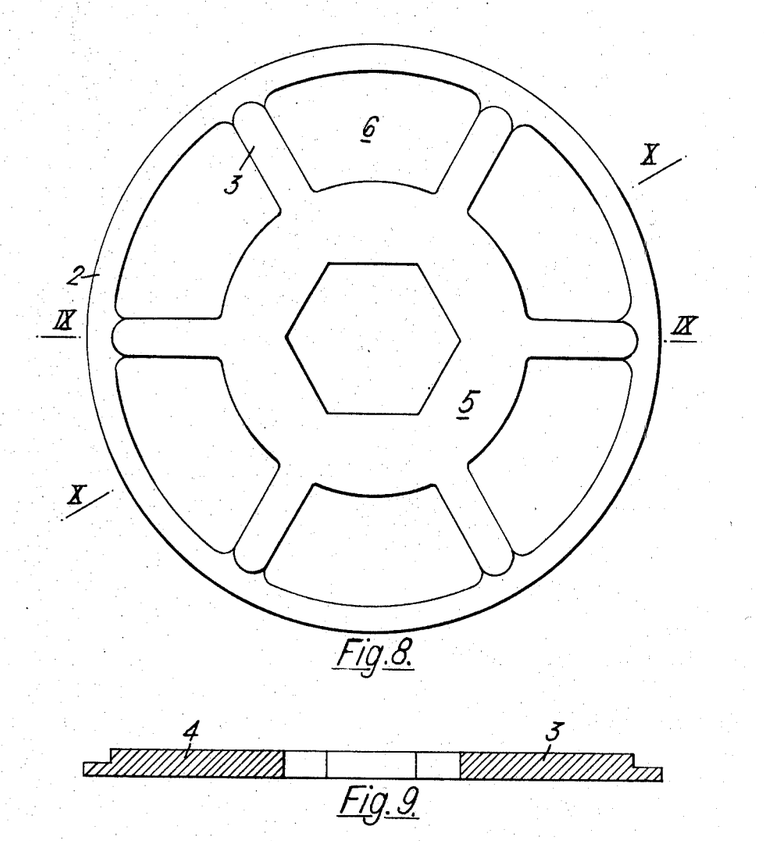
FIG. 8 is a plan view of another form of ring.
FIG. 9 illustrates a section along the line IX-IX of FIG. 8.
Figure 10:
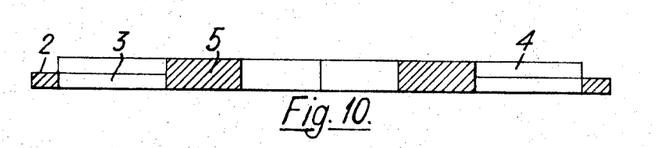
FIG. 10 corresponds to the section X-X of FIG. 8.
Figure 11:
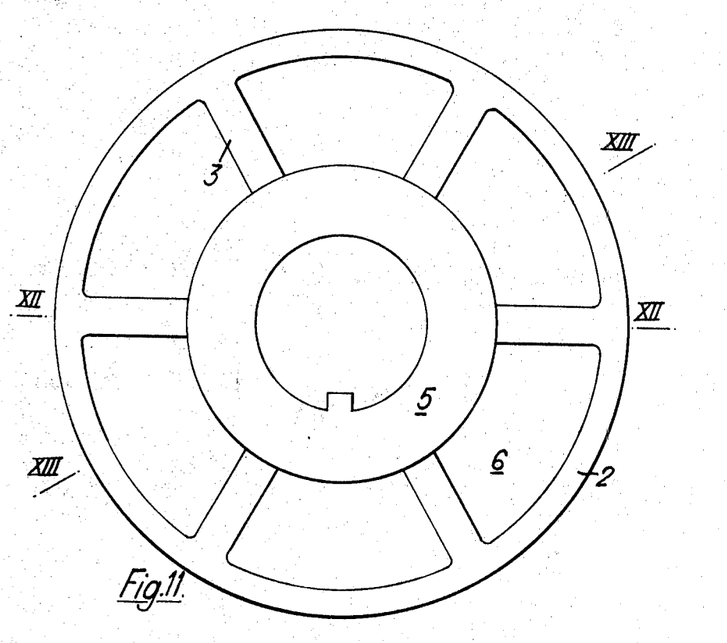
FIG. 11 is a plan view of another form of ring.
Figures 12, 13:
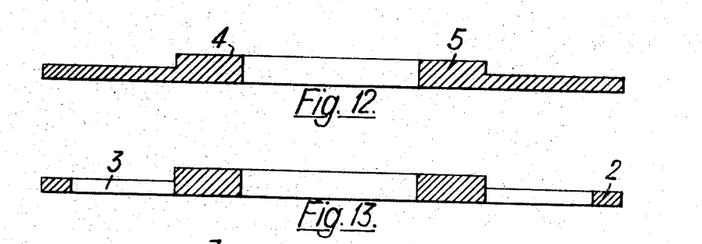
FIG. 12 shows a section along the line XII-XII of FIG. 11.
FIG. 13 shows a section along the line XIII-XIII of FIG. 11.

In the form of embodiment shown in FIGS. 3 and 4, the part 5 is omitted, the said spokes having their inner ends directly adjacent to the stem 1. In this case, one of the spokes 3 may be longer so that its inner end fits into a longitudinal keyway wrought in the stem 1 for positioning purposes.

In the other forms of embodiment, positioning is ensured by employing polygonal or other outlines for the stem 1 and the bore of 5.

The raised parts separating the rings may be wrought on one side only, or on both sides, of all the rings or of most of the rings, or may in some instances consist of flat washers interposed for appropriate separation between the said peripheral outflow rings.

The rings may be produced from any material possessing the required strength, in particular different qualities of stainless steel, bronze, brass, aluminum and the like, as well as different plastic materials.

As apparent from FIG. 18, the end piece 8 is of sufficient diameter to cover the openings of the adjacent ring, without excluding the possiblity that the said possiblity possibility that the said end piece may possess perforations corresponding to those of the said rings.

At the other extremity, intended for outflow, is situated an element 9 possessing passages corresponding to those formed by the perforations of the rings and intended for outflow of the filtrate. This element is connected to the other end of end piece 8 by a rod or stem 1 in such manner that the rings are all held together with the rigidity required.

The end pieces employed for assembly may also be such as to allow of outflow at both extremities of the filter candles or cartridges.

The stem 1 has a root extremity implanted in the end piece 8, its other extremity possessing a screw thread 10 on which is to be screwed a nut 11 as in FIGS. 18 and 19. A washer or the like 14 may be compressed between the nut 11 and the top of the element 9.

The rings forming the filter are pressed against each other by tightening the nut 11 on the element 9, thus forming the filter candle or cartridge.

The element 9 possesses an external screw thread 12 for fitting the said filter candle or cartridge into a bearer 18 with consequent compression of an interposed sealing ring or washer 13.

A slightly different arrangement is employed in the case illustrated in FIG. 20. The element 17, a previously marked 9, possesses an internal screw thread and can thus act as a nut for reception of the said screw thread 10 of the said stem. The element 8 may be loose and secured to the stem 1 by tightening a nut 15 on the screw-threaded extremity 16 of the said stem.

The peripheral outflow rings may be perforated and stamped out of metal sheet or plate by means of precision presses, or may be produced by casting of metal or plastic, or produced in composite form or in other manner.

If the rings are produced by means of precision presses, starting from flat sheet or plate with or without preliminary drilling or broaching of the openings, their production may be performed in a single operation, forming a vertical outer peripheral surface at right angles to the principal surfaces of the rings.

The said vertical outer surface may be roughened, milled, or ground before or after assembly into the said filter candle or cartridge, according to particular requirements.

The rings may moreover be produced from wire, or from bar stock of appropriate profile. Wire-working machines may be employed for example, of the type producing chain links, clips, and the like. The elements thus formed may then undergo a second stamping operation in appropriate presses, employing dies possessing the precise shape corresponding to the desired rings, this method being applicable if it is wished to avoid considerable wastage in the form of offcuts of sheet or plate.

The said rings may also be produced from plastic or metal by casting or extrusion into appropriate moulds in one or more operations.

The other elements employed for assembling the said rings may also be produced from any appropriate material and by any appropriate methods.

Figure 14:
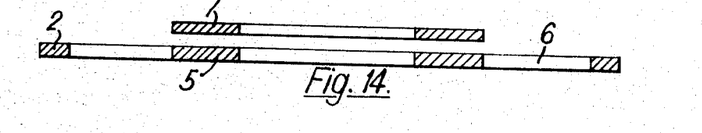
FIG. 14 shows an analogous section to FIG. 13, but with a different way of forming the same profile.
Figure 15:
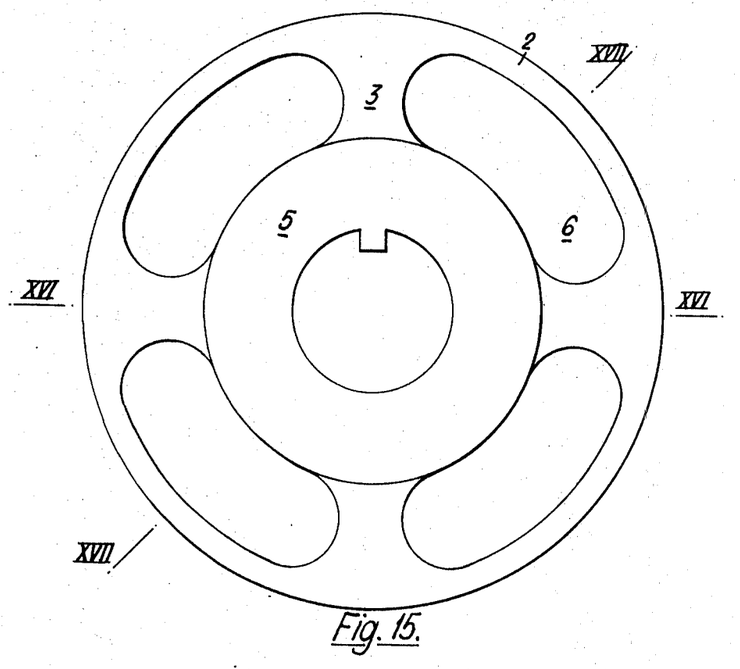
FIG. 15 is a plan view of another possible form of ring.
Figure 16:
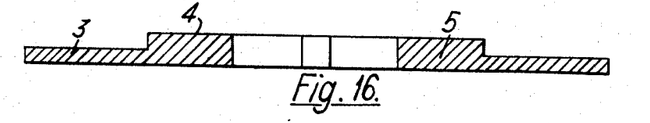
FIG. 16 illustrates a section along the line XVI-XVI of FIG. 15.
Figure 17:
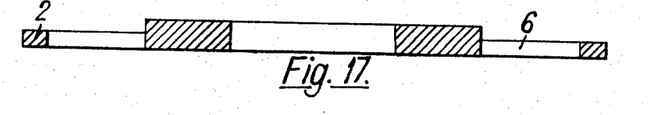
FIG. 17 illustrates a section along the line XVII-XVII of FIG. 15.

The raised parts may be formed at the same time on one or both sides of the said rings, or separating washers may be employed instead, as apparent from FIG. 14.

The rings and the elements for assembling the same into filter candles or cartridges may be of any appropriate size to ensure the highest efficiency of the filter as a function of the length of the cartridges, of the filtering substance employed, the filtering surface it is wished to obtain, and optimum exploitation of the materials employed for construction of the filter.

I claim:

1. A stack of axially aligned elements for a filtering candle each of said elements having an outer ring portion and a plurality of spokes having inner free ends and extending circumferentially spaced from each other in substantially radial direction inwardly from the inner periphery of said outer ring portion and defining between themselves and said inner periphery a plurality of openings; means for axially aligning said spokes and openings of the ring portions with each other, said aligning means comprising an axially extending spindle between said free ends of the spokes of said elements, said spindle being formed with a longitudinally extending groove and the free end of one of said spokes extending into said groove to thus align the elements of the stack; and spacer means for axially spacing at least said ring portions from each other, said spacer means being located radially inwardly of said outer ring portion so as to form between opposite faces of ring portions of adjacent elements uninterrupted gaps.

2. A stack of elements as defined in claim 1, wherein said spacer means are integrally formed with said spokes.